(12) United States Patent
Okura et al.

(10) Patent No.: US 8,421,002 B2
(45) Date of Patent: Apr. 16, 2013

(54) IMAGE PROJECTION APPARATUS HAVING A DUST-PROOF ENCLOSURE PORTION, A CABINET SHIELDING STRUCTURE AND A DETACHABLY DUST-PROOF COVER

(75) Inventors: Kenichiro Okura, Tokyo (JP); Haruhiko Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 312 days.

(21) Appl. No.: 13/018,091

(22) Filed: Jan. 31, 2011

(65) Prior Publication Data

US 2011/0188007 A1 Aug. 4, 2011

(30) Foreign Application Priority Data

Feb. 4, 2010 (JP) ................................. 2010-023581

(51) Int. Cl.
*H01J 5/02* (2006.01)
(52) U.S. Cl.
USPC ............................................ 250/239; 353/75
(58) Field of Classification Search .................. 250/239, 250/208.1; 353/119, 74–77; 348/825–838
See application file for complete search history.

(56) References Cited

U.S. PATENT DOCUMENTS 5,929,945 A * 7/1999 Negishi et al. ................ 348/825

FOREIGN PATENT DOCUMENTS

JP 2007-219447 A 8/2007

* cited by examiner

*Primary Examiner* — Que T Le
(74) *Attorney, Agent, or Firm* — Birch, Stewart, Kolasch & Birch, LLP

(57) ABSTRACT

A dust-proof enclosure portion which stores therein an emission portion of a projection unit and in which a projection window from which image light is emitted is formed to direct upward, and a cabinet shielding structure which holds a screen on a front side, in which an opening that introduces the image light emitted from the projection window of the projection unit is included, and in which a second reflection mirror that reflects the introduced image light toward the rear surface of the screen is arranged are included, in which a second dust-proof cover is detachably attached to the opening (light introducing and managing opening) of the cabinet shielding structure, the projection window is exposed in a state where the second dust-proof cover is removed, and the cabinet shielding structure is a sealed structure in a state where the second dust-proof cover is attached.

14 Claims, 12 Drawing Sheets

IMAGE PROJECTION APPARATUS HAVING A DUST-PROOF ENCLOSURE PORTION, A CABINET SHIELDING STRUCTURE AND A DETACHABLY DUST-PROOF COVER

BACKGROUND OF THE INVENTION

1. Field of the Invention

The present invention relates to an image projection apparatus that is configured such that a screen is arranged on a device front side, a projection unit is arranged in a device lower portion, image light from the projection unit is emitted upward and is caused to reflect by a reflection mirror arranged in a device upper portion, and an incident angle at which the image light is projected on a rear surface of the screen is set to an acute angle to shorten a depth from the projection unit to the screen.

2. Description of the Related Art

In an image projection apparatus that includes a screen provided on a device front side and an optical element arranged in the device, a dust-proof enclosure structure for preventing dust from entering from outside is needed in an internal space in which image light passes. Conventionally, for example, an image projection unit forms an enclosure structure portion that includes a projection window through which the image light reflected from an aspherical mirror passes, and this enclosure structure portion, a screen provided on a cabinet front side, and a reflection mirror provided on a cabinet top surface form the dust-proof enclosure structure for a part through which the image light passes together with a rear design cabinet of the image projection apparatus. The rear design cabinet is part of the enclosure and does not have an opening such as a heat radiating hole. The rear side of the cabinet is partially depressed to provide a storing portion in which a main electric circuit chassis is stored. The lid of this storing portion has a plurality of heat radiating holes to have a cooling structure of releasing heat to the outside (for example, see Japanese Patent Application Laid-open No. 2007-219447).

In the above image projection apparatus, when it is needed to clean dust accumulated on the upper surface of the projection window arranged in the emission portion of the image projection unit, before the large rear design cabinet which holds a plate base chassis on which a main electric circuit board is mounted and in which a speaker unit is stored is removed, the surface of the projection window cannot be exposed. The large and heavy rear design cabinet needs to be removed and the base chassis is provided on the rear design cabinet side, so that when removing the rear design cabinet, a connection cable with the image projection unit needs to be disconnected or be a sufficiently long cable.

Moreover, after removing the rear design cabinet, the screen provided on the cabinet front side, the reflection mirror provided on the cabinet top surface, and the like are exposed, so that dust from outside enters the inside of the cabinet while cleaning the projection window of the image projection unit in some cases. Furthermore, the main electric circuit chassis is stored in the storage recess portion on the cabinet rear side and a plurality of heat radiating holes is provided in the lid of this storing portion to have the cooling structure for releasing heat to the outside, so that airflow for cooling the main electric circuit chassis cannot be sufficiently secured. Moreover, a light collecting portion at which the image light crosses before being reflected by the reflection mirror provided on the top surface of the cabinet is spaced from the image projection unit, so that the size of the projection window needs to be made large, which results in increasing the cost.

SUMMARY OF THE INVENTION

It is an object of the present invention to at least partially solve the problems in the conventional technology.

An image projection apparatus according to an aspect of the present invention including a projection unit that emits image light, a reflection mirror that reflects the image light emitted from the projection unit, and a screen on a rear surface of which the image light reflected by the reflection mirror is projected, includes: a dust-proof enclosure portion which stores therein an emission opening of the image light of the projection unit and an optical element of an emission portion airtightly and in which a projection window from which the image light is emitted is formed; and a cabinet shielding structure which holds the screen on a front side, in which a light introducing and managing opening which introduces the image light emitted from the projection window of the projection unit and from which cleaning of the projection window is possible is opened in a rear surface, and in which the reflection mirror that reflects the image light introduced from the light introducing and managing opening toward the rear surface of the screen is arranged, wherein a dust-proof cover is detachably attached to the light introducing and managing opening of the cabinet shielding structure, the projection window is exposed in a state where the dust-proof cover is removed, and the projection window is covered and a space in the cabinet shielding structure is sealed in a state where the dust-proof cover is attached.

An image projection apparatus according to another aspect of the present invention including a projection unit that emits image light, a reflection mirror that reflects the image light emitted from the projection unit, and a screen on a rear surface of which the image light reflected by the reflection mirror is projected, and in which the screen is arranged on a device front side, the projection unit is arranged on a device rear portion lower side, the image light emitted upward from the projection unit is reflected downward by the reflection mirror arranged in a device upper portion, and the image light is caused to enter the rear surface of the screen at an acute angle, includes: a dust-proof enclosure portion which stores therein an emission opening of the image light of the projection unit and an optical element of an emission portion airtightly and in which a projection window from which the image light is emitted is formed; and a cabinet shielding structure which holds the screen, in which a light introducing and managing opening which introduces the image light emitted from the projection window of the projection unit and from which cleaning of the projection window is possible is opened in a rear wall surface extending along the image light directed upward, and in which the reflection mirror that reflects the image light introduced from the light introducing and managing opening toward the rear surface of the screen is arranged, wherein a dust-proof cover is detachably attached to the light introducing and managing opening of the cabinet shielding structure, the projection window is exposed in a state where the dust-proof cover is removed, and the projection window is covered and a space in the cabinet shielding structure is sealed in a state where the dust-proof cover is attached.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The embodiment of an image projection apparatus according to the present invention will be explained below in detail with reference to the drawings. The present invention is not limited to this embodiment.

Embodiment

Figure 1:
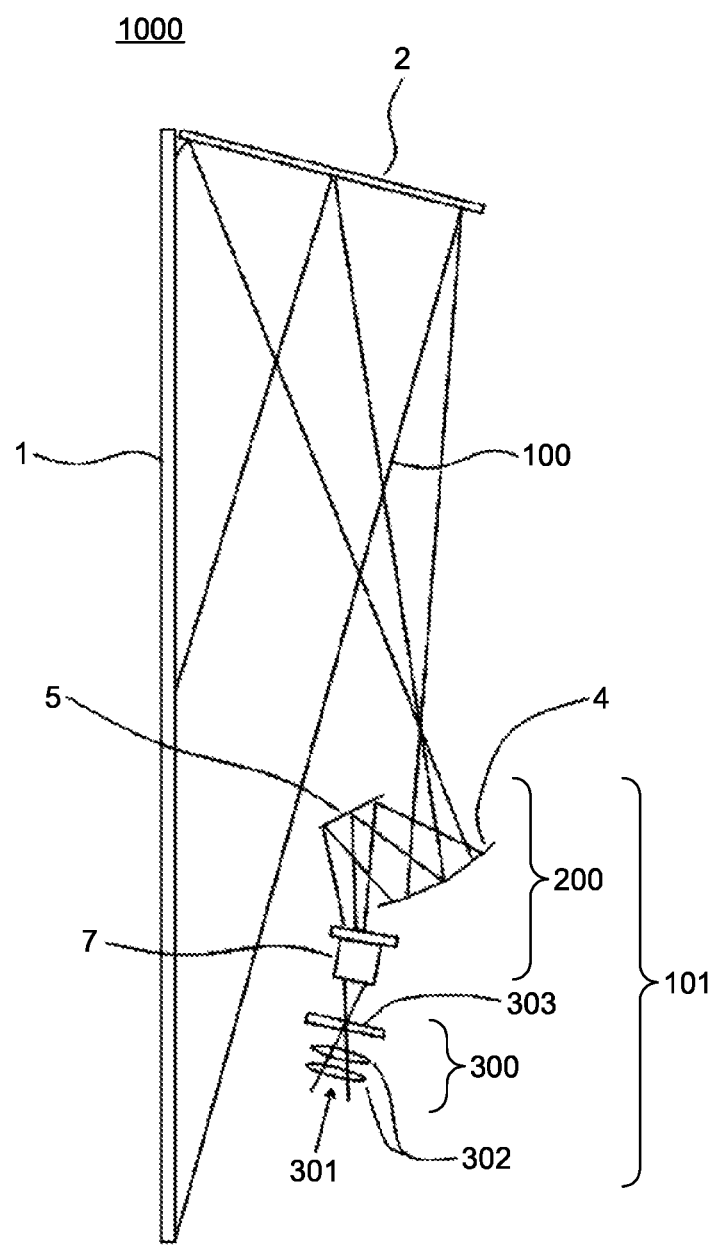
FIG. 1 is a schematic diagram of a whole configuration optical layout of an image projection apparatus.
Figure 2:
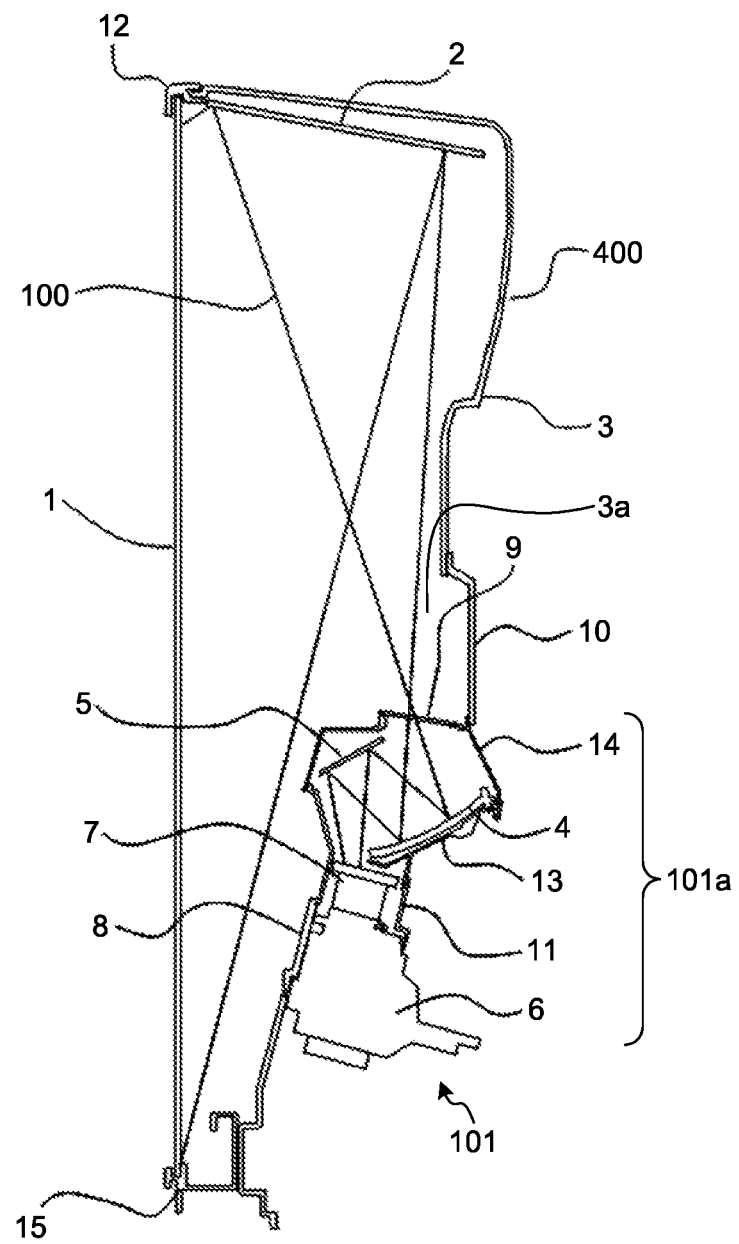
FIG. 2 is a cross-sectional view of a dust-proof structure of the whole image projection apparatus.
Figure 3:
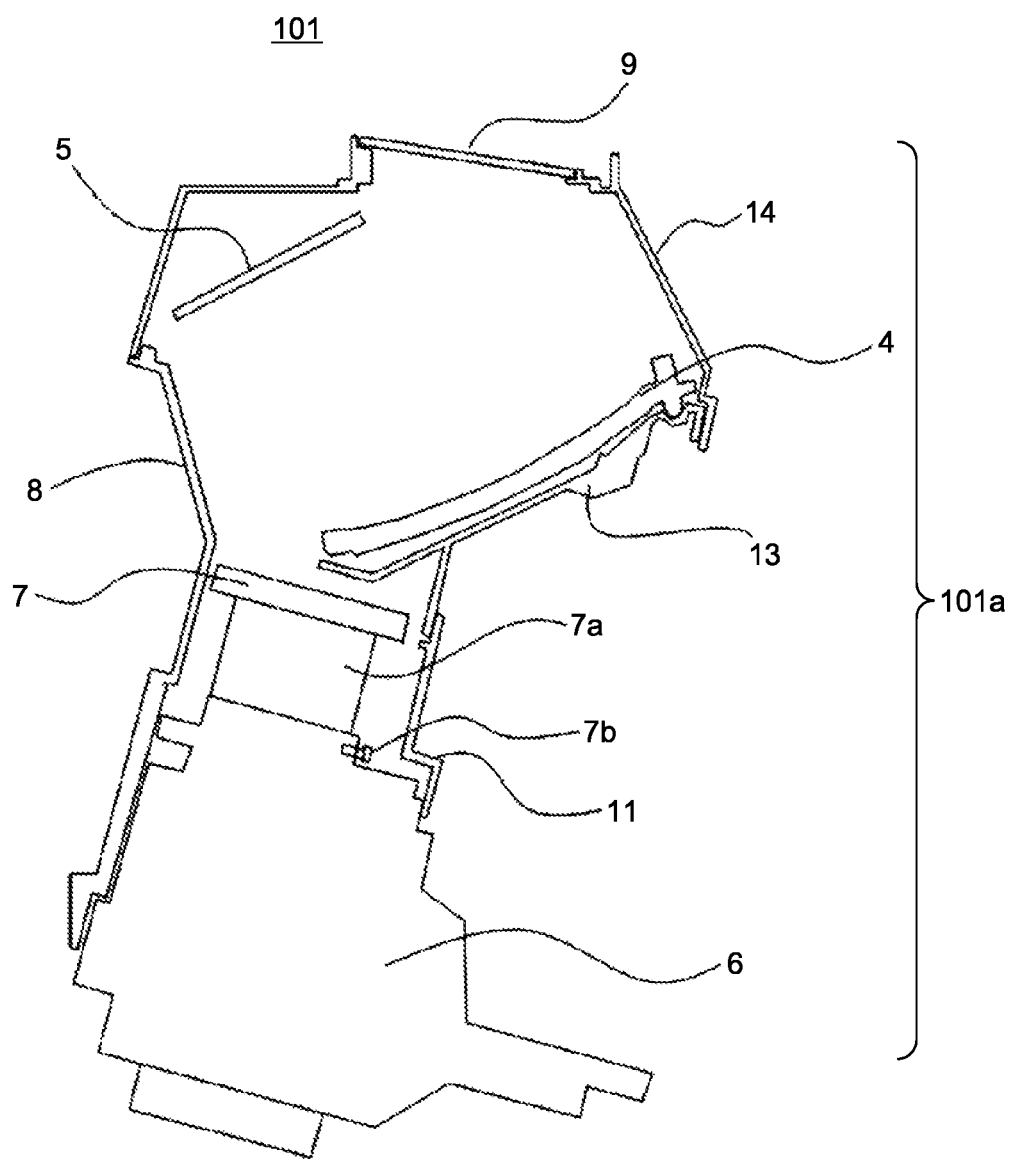
FIG. 3 is a vertical cross-sectional view of a projection unit.
Figure 4:
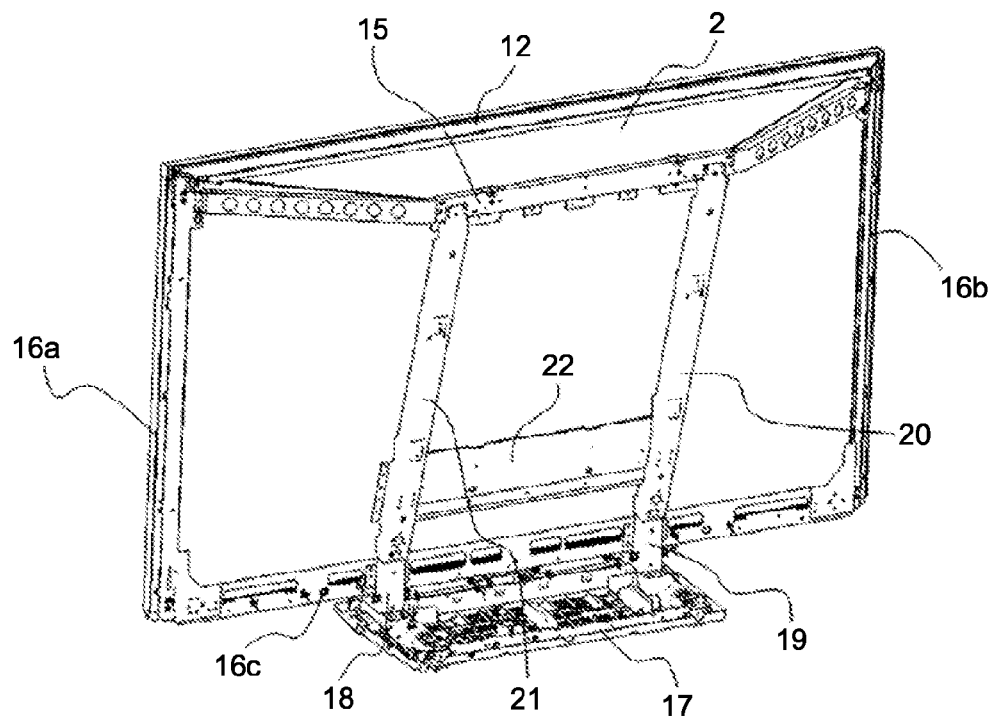
FIG. 4 is a perspective view of a chassis frame structure that holds a screen and a second reflection mirror.
Figure 5:
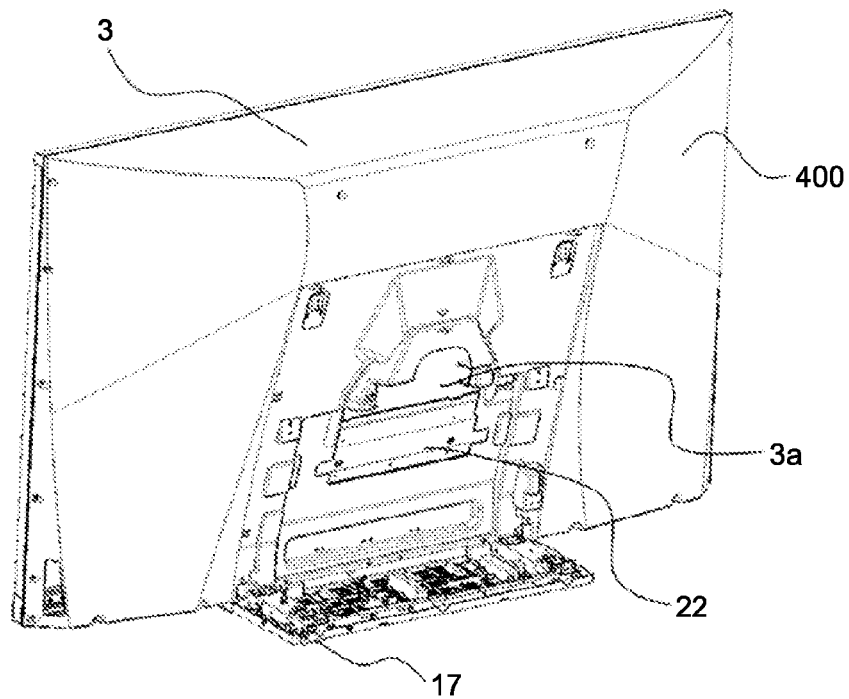
FIG. 5 is a perspective view of a cabinet shielding structure in which a cabinet having a small opening through which image light passes is fixed to the chassis frame structure.
Figure 6:
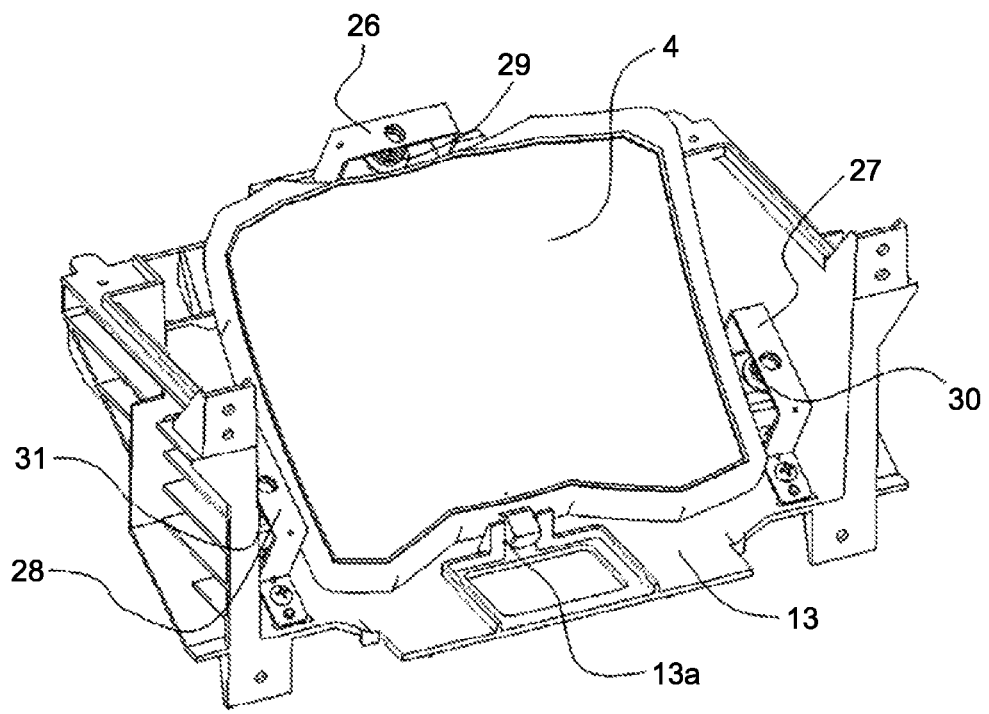
FIG. 6 is a perspective view for explaining a holding portion of an aspherical mirror in which a reflection surface that reflects the image light is rotationally symmetric around an optical axis.
Figure 7:
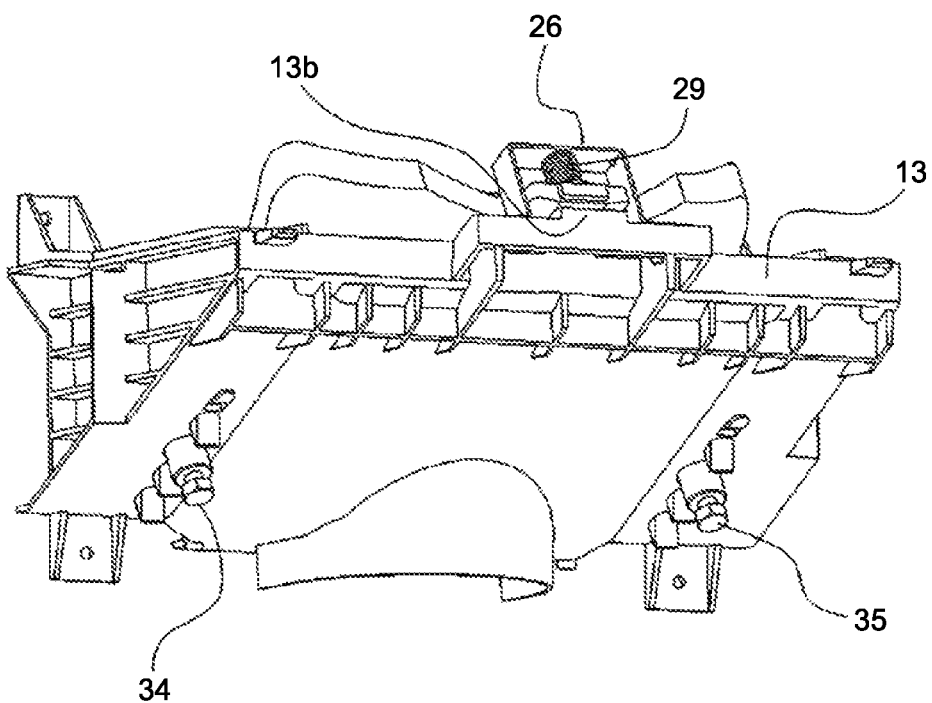
FIG. 7 is another perspective view for explaining the aspherical-mirror holding portion.
Figure 8:
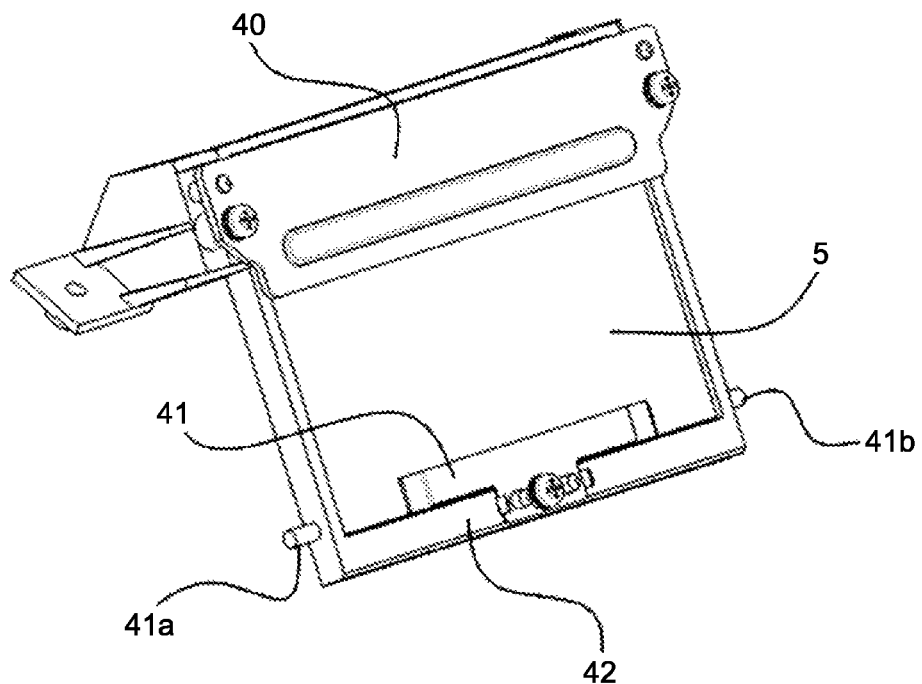
FIG. 8 is a perspective view of a first-reflection-mirror holding portion that holds a fist reflection mirror in which a reflection surface that reflects the image light has a planar shape.
Figure 9:
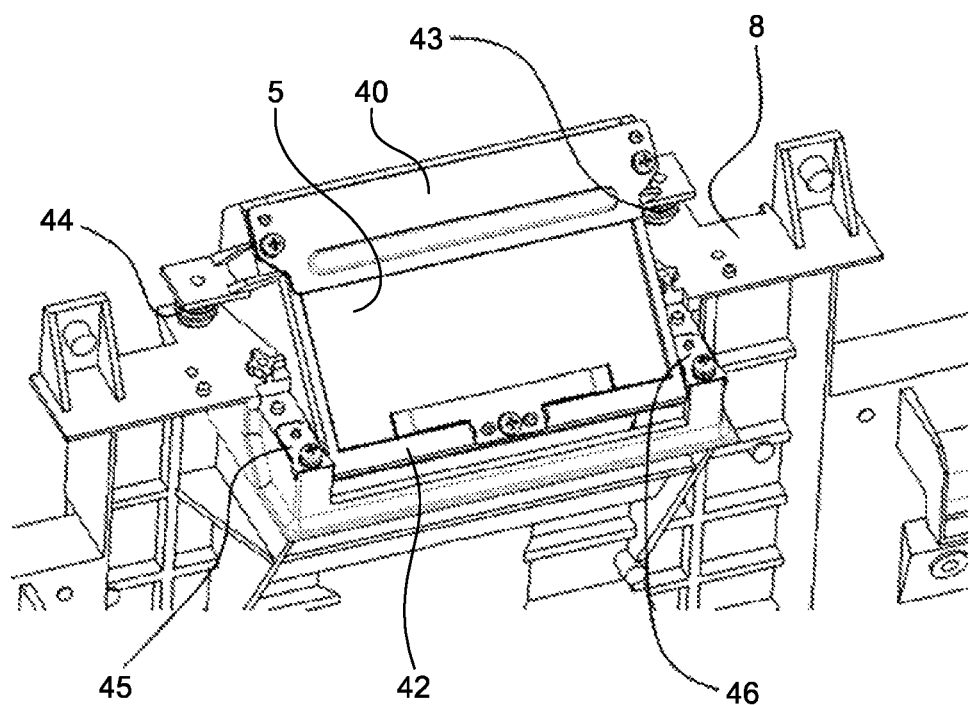
FIG. 9 is a perspective view illustrating a procedure of attaching the first-reflection-mirror holding portion to a base.
Figure 10:
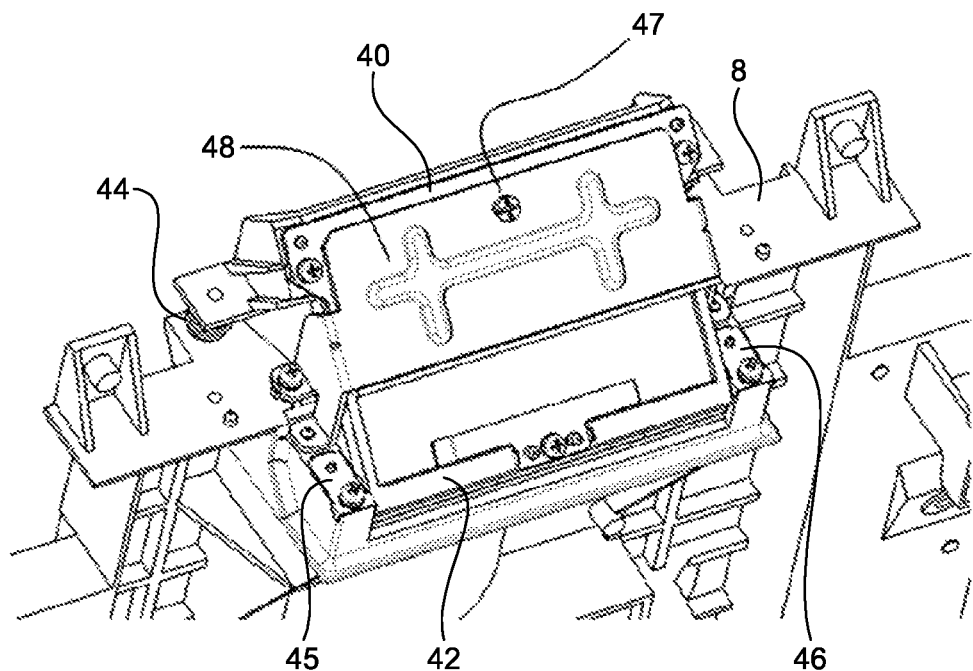
FIG. 10 is a perspective view explaining the first-reflection-mirror holding portion.
Figure 11:
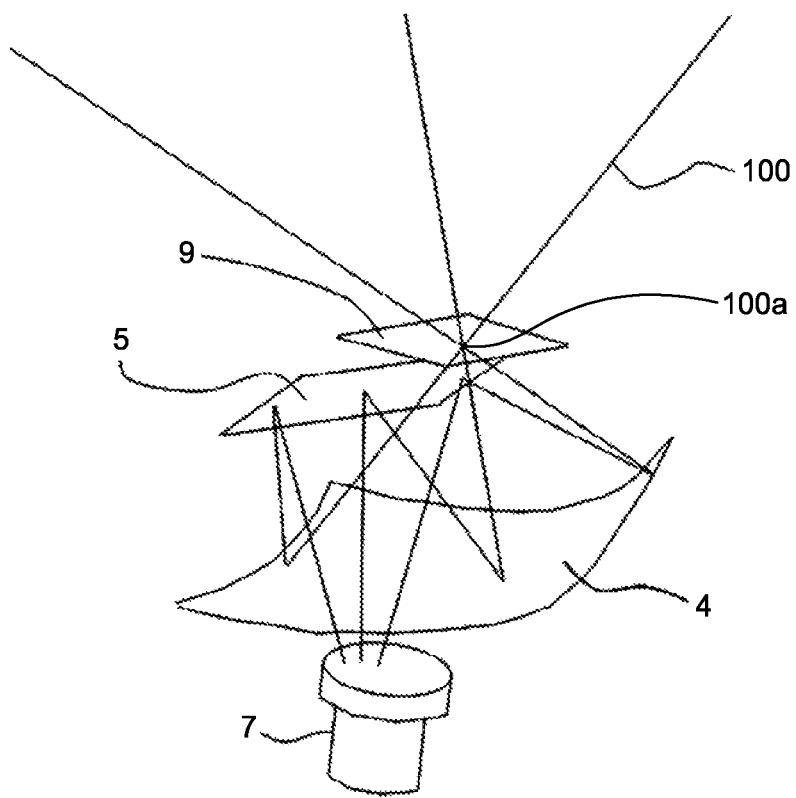
FIG. 11 is a perspective view of part of the image light of the image projection apparatus.
Figure 12:
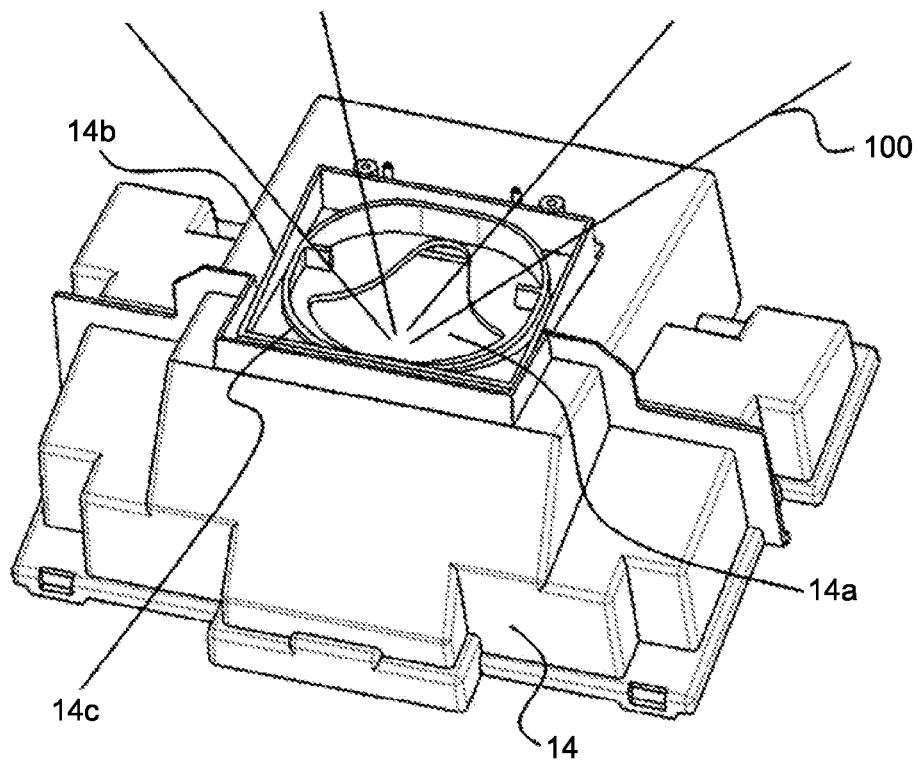
FIG. 12 is a perspective view of a holding portion of a window glass plate.
Figure 13:
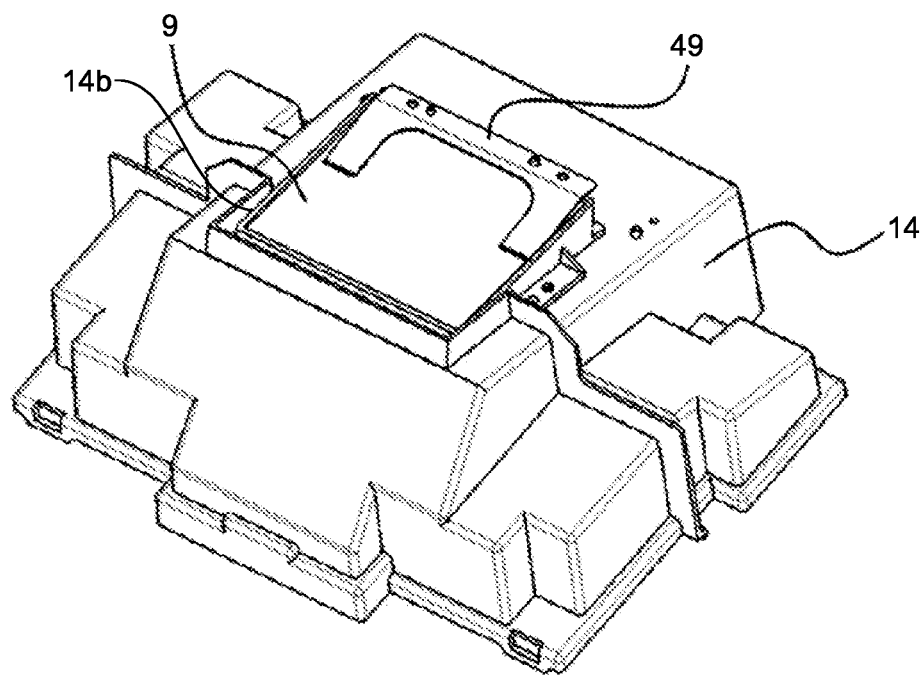
FIG. 13 is a perspective view of the window-glass-plate holding portion explaining attachment of the window glass plate.
Figure 14:
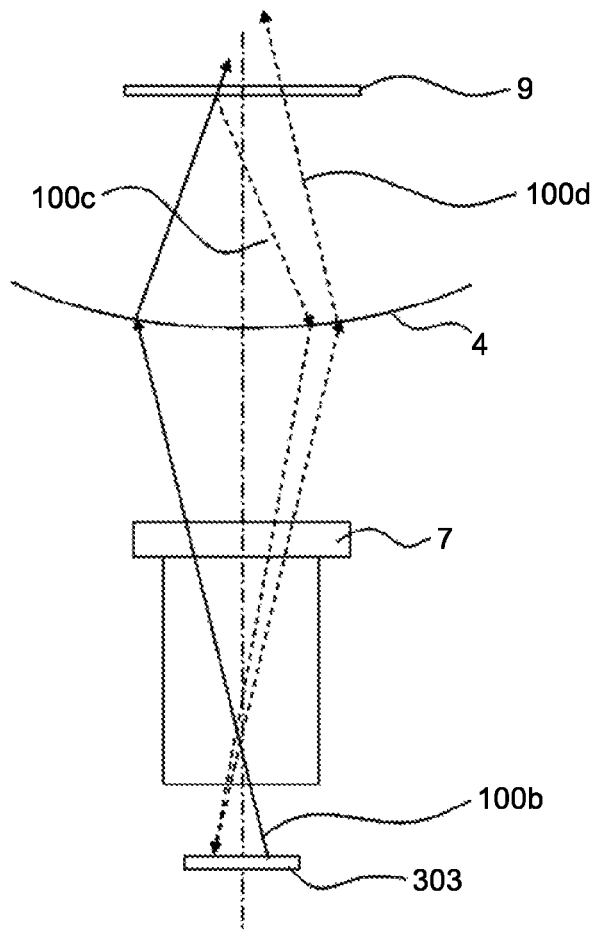
FIG. 14 is a diagram for explaining retroreflective light that is generated due to reflection light by the window glass plate.
Figure 15:
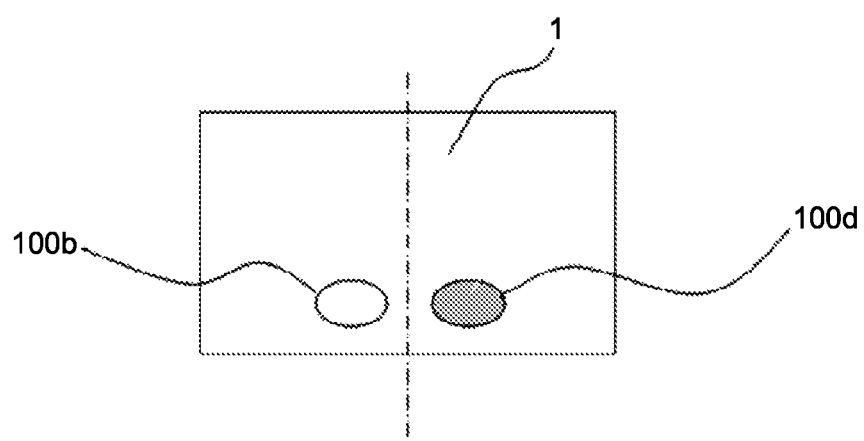
FIG. 15 is a diagram for explaining how the retroreflective light is seen on the screen.
Figure 16:
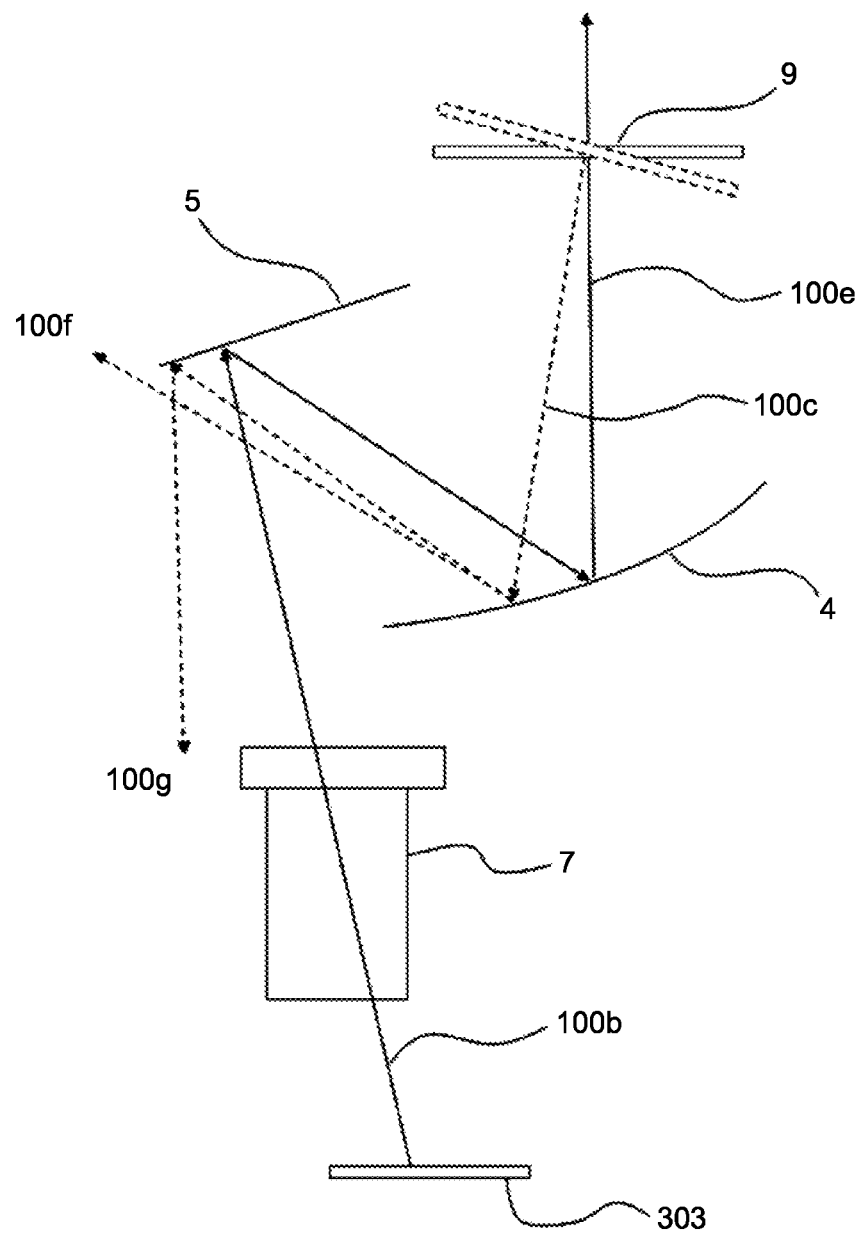
FIG. 16 is an explanatory diagram of an effect of arranging the window glass plate to tilt with respect to the image light.
Figure 17:
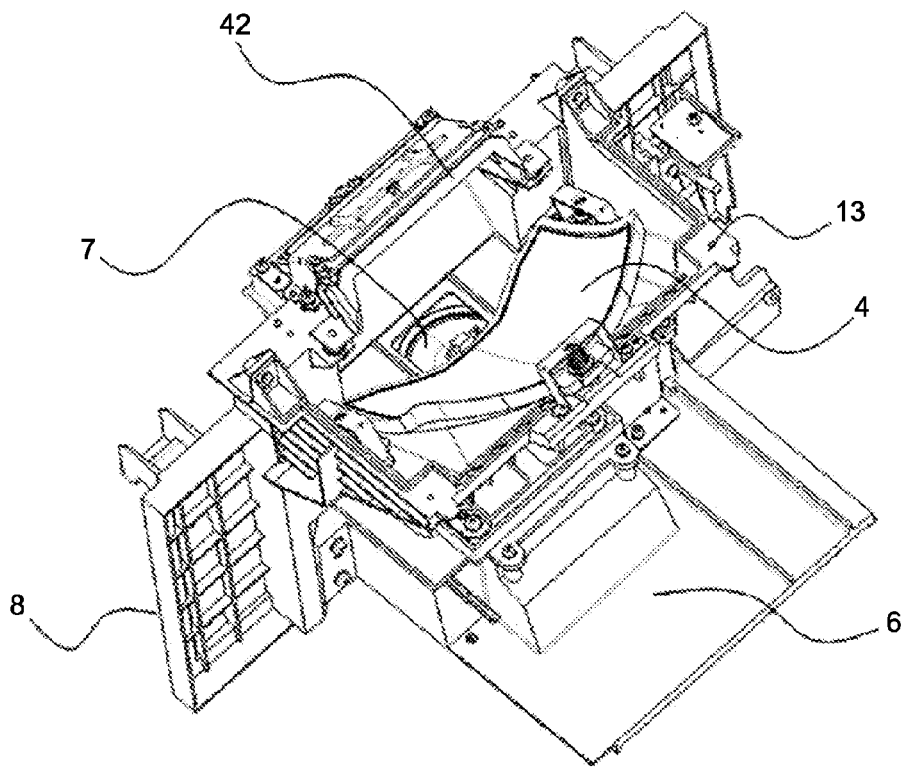
FIG. 17 is a perspective view of the projection unit in a state where the window-glass-plate holding member is not attached.
Figure 18:
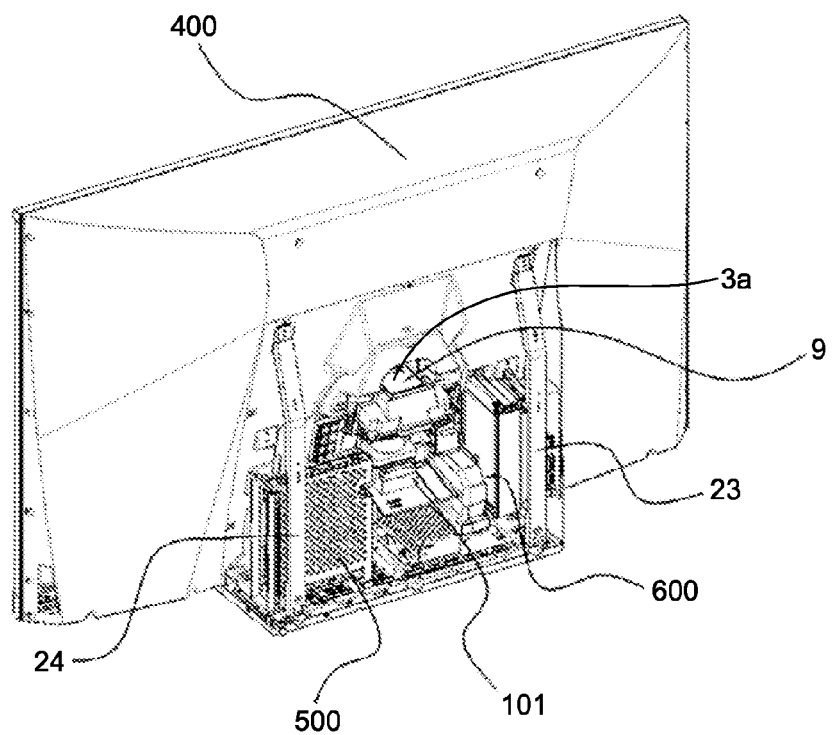
FIG. 18 is a perspective view illustrating a state where the projection unit is fixed to the cabinet shielding structure and a chassis unit and a light source unit are arranged in a rear portion of the cabinet shielding structure.
Figure 19:
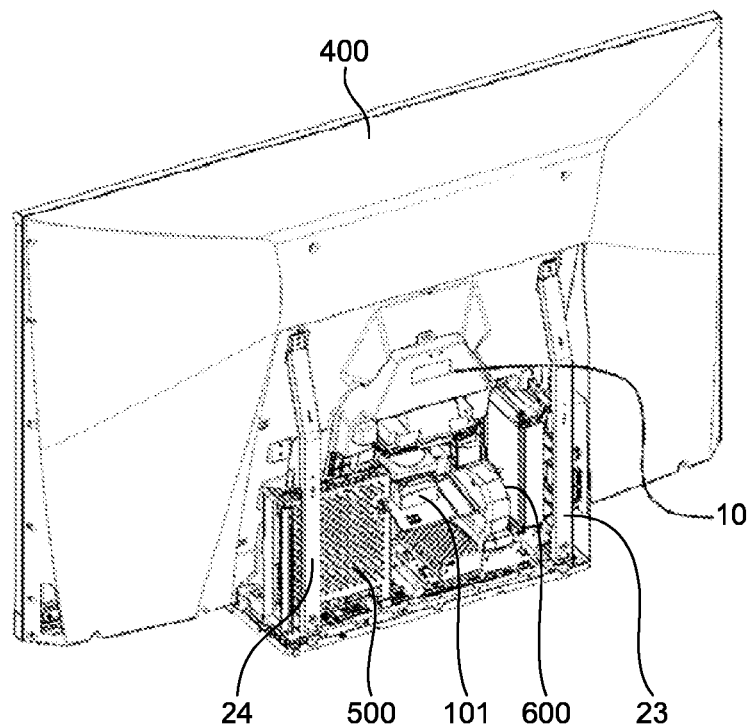
FIG. 19 is a perspective view illustrating a state where a second dust-proof cover is fixed to the rear portion of the cabinet shielding structure.
Figure 20:
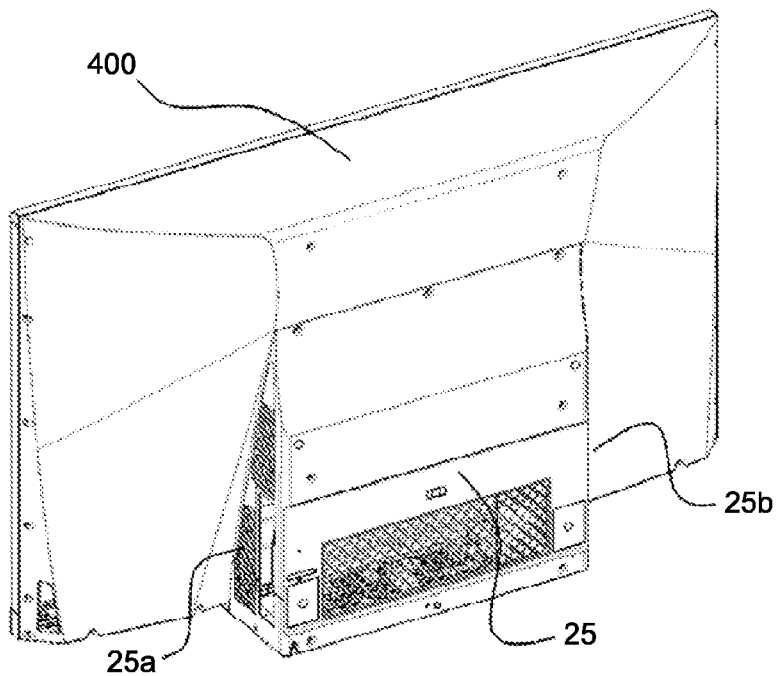
FIG. 20 is a perspective view of a completed image projection apparatus to which a back cover is attached.

The embodiment of the present invention is explained below in detail with reference to the drawings. FIG. 1 is a schematic diagram of a whole configuration optical layout of an image projection apparatus. FIG. 2 is a cross-sectional view of a dust-proof structure of the whole image projection apparatus according to the present embodiment. FIG. 3 is a vertical cross-sectional view of a projection unit. FIG. 4 is a perspective view of a chassis frame structure that holds a screen and a second reflection mirror. FIG. 5 is a perspective view of a cabinet shielding structure in which a cabinet having a small opening through which image light passes is fixed to the chassis frame structure. FIG. 6 is a perspective view for explaining a holding member of a reflection optical element (hereinafter, aspherical mirror) in which a reflection surface that reflects the image light is rotationally symmetric around an optical axis. FIG. 7 is another perspective view for explaining the aspherical-mirror holding member. FIG. 8 is a perspective view of a first-reflection-mirror holding member that holds a fist reflection mirror in which a reflection surface that reflects the image light has a planar shape. FIG. 9 is a perspective view illustrating a procedure of attaching the first-reflection-mirror holding member to a base. FIG. 10 is a perspective view explaining the first-reflection-mirror holding member. FIG. 11 is a perspective view of part of the image light of the image projection apparatus in the present embodiment. FIG. 12 is a perspective view of a holding member of a window glass plate. FIG. 13 is a perspective view of the window-glass-plate holding member explaining attachment of the window glass plate. FIG. 14 is a diagram for explaining retroreflective light that is generated due to reflection light by the window glass plate. FIG. 15 is a diagram for explaining how the retroreflective light is seen on the screen. FIG. 16 is an explanatory diagram of an effect of arranging the window glass plate to tilt with respect to the image light. FIG. 17 is a perspective view of the projection unit in a state where the window-glass-plate holding member is not attached. FIG. 18 is a perspective view illustrating a state where the projection unit is fixed to the cabinet shielding structure and a chassis unit and a light source unit are arranged in a rear portion of the cabinet shielding structure. FIG. 19 is a perspective view illustrating a state where a second dust-proof cover is fixed to the rear portion of the cabinet shielding structure. FIG. 20 is a perspective view of a completed image projection apparatus to which a back cover is attached.

As shown in FIG. 1, an image projection apparatus 1000 is configured to include a projection unit 101 that includes a projection optical system 200 and an illumination optical system 300, a second reflection mirror (reflection mirror) 2, and a screen 1. The projection optical system 200 enlarges image light emitted from the illumination optical system 300 by a projection lens 7, reflects it by a first reflection mirror 5 and an aspherical mirror 4, and projects image light 100 on the second reflection mirror 2. The image light 100 reflected by the second reflection mirror 2 is displayed on the screen 1. The illumination optical system 300 includes a lens 302 that collects light emitted from a light source portion 301 and an image display element 303 that performs spatial modulation on light emitted from the lens 302.

The light source portion 301 is, for example, a lamp light source, a laser light source, or an LED light source. The image display element 303 is, for example, a liquid crystal element or a DMD (Digital Micro-mirror Device), and converts incident light into the image light by reflecting or transmitting the incident light. The image light subjected to the spatial modulation by the image display element 303 is enlarged by the projection lens 7, is further reflected by the first reflection mirror 5, and is reflected by the aspherical mirror 4. The image light 100 reflected by the aspherical mirror 4 is once collected and is spread again to be projected onto the second reflection mirror 2, is reflected by the second reflection mirror 2, and is projected onto the rear surface of the screen 1.

In FIG. 2, a cabinet shielding structure 400 is configured to include the screen 1 provided on the front side, a screen frame 12, and a cabinet 3 that covers a screen holding portions 16a, 16b, and 16c that hold the screen 1 and the second reflection mirror 2 arranged in the device upper portion and has a small opening (light introducing and managing opening) 3a which is formed in an approximately vertical wall surface configuring the rear portion and through which the image light 100 passes. The opening (light introducing and managing opening) 3a is an introduction opening for introducing the image light into the cabinet shielding structure 400 and, as described later, is a small window to be used when cleaning a window glass plate 9 fitted to a projection window of a dust-proof enclosure portion 101a for maintenance of maintaining and managing a product.

In FIG. 2 and FIG. 3, the dust-proof enclosure portion 101a of the projection unit 101 is configured to include a holding member 13 that fixes the aspherical mirror 4, a base 8 that fixes the aspherical-mirror holding member 13 and an optical engine 6, the window glass plate (projection window) 9, a holding member 14 that holds the window glass plate 9, and a first dust-proof cover 11. This dust-proof enclosure portion 101a encloses a circumference of a light path near the emission opening of the projection unit 101 airtightly and stores therein the optical element. As shown in FIG. 2, the opening 3a and the window glass plate 9 are provided adjacent to each other, and the surface including the opening 3a and the window glass plate 9 face with each other at a predetermined angle to open in a rear direction.

In FIG. 4, a chassis frame structure that holds the screen 1 and the second reflection mirror 2 is explained. A second-reflection-mirror holding portion 15 is fixed to the screen holding portions 16a and 16b and is fixed to frame members 20 and 21 fixed to holding members 18 and 19 provided to a television base portion 17. Moreover, the holding members 18 and 19 are fixed to the screen holding portion 16c. Furthermore, a structural member 22 for fixing the projection unit 101 is attached between the frame member 20 and the frame member 21. This structural member 22 is a pusher member having a hollow cross-sectional shape and ensures strength sufficient for holding the projection unit 101.

As shown in FIG. 5, the cabinet 3 having the small opening 3a that introduces the image light 100 in the rear portion is fixed to the above chassis frame structure. Consequently, the cabinet shielding structure 400 in which the small opening through which the image light passes is formed in the rear portion and other parts are sealed is configured.

As shown in FIG. 6 and FIG. 7, the aspherical mirror 4 is arranged on the inner side portion of the holding member 13. The aspherical mirror 4 is placed on an aspherical-mirror pivot-shaped holding portion 13b of the holding member and the tips of aspherical-mirror adjusting screws 34 and 35 incorporated in the holding member 13, and one end portion of the aspherical mirror 4 is inserted into an aspherical-mirror guide-shaped holding portion 13a. The aspherical mirror 4 is fixed by spring pressing members 26, 27, and 28 via springs 29, 30, and 31. The holding member 13 can be a die-cast product of aluminum, magnesium, or the like, a molded product of resin, or a machined product of aluminum or the like. The arrangement portion for the aspherical mirror 4 moves up and down by rotating the adjusting screws 34 and 35 clockwise or counterclockwise with the pivot portion as a support, and the aspherical mirror 4 moves, so that an image distortion on the screen 1 can be adjusted. The aspherical mirror 4 is such that. The holding member 13 that holds the aspherical mirror 4 is fixed to the base 8. The base 8 is a component that is important in terms of dimensional accuracy and strength and is desirably a die-cast product of aluminum, magnesium, or the like or a machined product of aluminum.

Next, an attaching structure for the first reflection mirror 5 is schematically explained. In FIG. 8, the first reflection mirror 5 is stored and arranged in a holding member 42, and is pressed and held by a pressing member 40 and a pressing member 41. The holding member 42 includes shaft portions 41a and 41b on the right and left sides.

As shown in FIG. 9, the shaft portions 41a and 41b of the holding member 42 in a state of holding the first reflection mirror 5 are arranged in a V groove-shaped portion of the base 8 and the shaft portions 41a and 41b are pressed and held by shaft-portion pressing members 45 and 46. Moreover, springs 43 and 44 are inserted between the holding member 42 and the base 8.

As shown in FIG. 10, a holding member 48 that includes a first-reflection-mirror adjusting screw 47 is fixed to the base 8. The tip of the adjusting screw 47 is arranged to be in contact with the surface of the pressing member 40. The holding member 42 for the first reflection mirror 5 moves up and down by rotating the adjusting screw 47 clockwise or counterclockwise with the shaft portions 41a and 41b as a support and the reflection surface of the first reflection mirror 5 moves, so that an image deflection and a focus level on the screen 1 can be adjusted.

Next, the holding structure for the window glass plate 9 is explained. FIG. 11 is an enlarged perspective view of part of the image light 100 in the image projection apparatus in the present embodiment. As described above, the image light 100 reflected by the aspherical mirror 4 is once collected (crosses) and is projected to the second reflection mirror 2. An image projection layout in which an image light collecting portion 100a is arranged to be close to the aspherical mirror 4 is configured and the window glass plate 9 is arranged in the image light collecting portion 100a. The window glass plate 9 is an emission opening (projection window) of the image light 100 of the dust-proof enclosure portion 101a in the projection unit 101, and the size (area) thereof can be made small by arranging the window glass plate 9 in the image light collecting portion 100a, so that the cost of the window glass plate 9 itself can be reduced.

FIG. 12 is a perspective view of the holding member 14 that holds the window glass plate 9. The holding member 14 includes an image-light passing opening 14a through which the image light 100 passes, a frame-shaped rib portion 14b, and a loop-shaped rib 14c. As shown in FIG. 13, the window glass plate 9 is inserted into the inside of the frame-shaped rib portion 14b of the holding member 14 and the surface of the window glass plate 9 is arranged to be in contact with the upper surface of the loop-shaped rib 14c of the holding member 14. With a pressing member 49, the window glass plate 9 is pressed and held. The image-light passing opening 14a has an opening shape (mask shape) having a minimum area that the image light 100 can pass through. Consequently, unnecessary light is blocked by the image-light passing opening 14a, so that contrast and brightness on the screen are improved. Moreover, the window glass plate 9 is arranged to be in contact with the upper surface of the loop-shaped rib 14c of the holding member 14, and the outer peripheral edge portion of the window glass plate 9 is positioned on the outside of this contact arrangement portion. Consequently, if dust or chips adhered to the outer peripheral edge portion of the window glass plate 9 fall during transportation or upon impact, these dust or chips fall between the frame-shaped rib portion 14b and the loop-shaped rib 14c of the holding member 14 and therefore do not enter the dust-proof enclosure portion 101a in the projection unit 101 from the image-light passing opening 14a, so that the inside of the projection unit 101 can be maintained clean.

In FIG. 14, if the aspherical mirror 4 is arranged and configured in the same manner as the present embodiment, after original image light (ON light) 100b from the image display element 303 is reflected by the aspherical mirror 4, reflection light 100c is generated by the window glass plate 9. The aspherical mirror 4 is such that the reflection surface is rotationally symmetric around the optical axis, so that the reflection light 100c by the window glass plate returns to the position symmetric to the emission position of the original image light (ON light) 100b on the image display element 303. Moreover, the reflection light 100c is reflected on the image display element 303 and is directed onto the screen 1 as a retroreflective light (ghost light) 100d. As shown in FIG. 15, if an image by the original image light (ON light) 100b is displayed on the left side of the center on the screen 1, the retroreflective light 100d tends to be displayed at a symmetric position on the right side of the center.

In the present embodiment, as shown in FIG. 16, the window glass plate 9 is arranged to tilt on the rear side so as not to be vertical to an image main light beam 100e, so that, after the reflection light 100c by the window glass plate 9 is reflected by the aspherical mirror 4, the reflection light 100c becomes light 100f out of the effective range of the first reflection mirror or light 100g out of the effective range of the projection lens, and therefore does not return to the image display element 303. Thus, the retroreflective light (ghost light) from the image display element 303 is not generated.

As shown in FIG. 3, the holding member 14 in a state of holding the window glass plate 9 is held in a state of covering the aspherical mirror 4 and the first reflection mirror 5. The reflection surface of the aspherical mirror 4 and the upper surface of the projection lens 7 are directed upward, so that, as shown in FIG. 17, in a state where the holding member 14 for the window glass plate 9 is not attached, there is a problem that dust from outside falls and is easily accumulated on the reflection surface of the aspherical mirror 4 and the upper surface of the projection lens 7; however, by attaching the holding member 14 for the window glass plate 9 in a state where dust does not exist on the reflection surface of the aspherical mirror 4 and the upper surface of the projection lens 7 in a room having a high cleanliness, dust from above is all accumulated only on the upper surface of the window glass plate 9 after the projection unit 101 is moved out of the room having a high cleanliness, so that dust does not fall on the aspherical mirror 4 and the upper surface of the projection lens 7.

In FIG. 3, the projection lens 7 can adjust the focus level on the screen 1 by rotating a focus adjusting ring portion 7a by hand. For rotating the ring portion 7a, a fixing screw 7b that suppresses rotation of the ring portion 7a needs to be loosened. After loosening the fixing screw 7b, the ring portion 7a is rotated by hand, whereby the focusing level on the screen 1 is adjusted. After the adjustment, the fixing screw 7b is fastened. Thereafter, the first dust-proof cover 11 is fixed to cover the holding member 13 and the optical engine 6, whereby the dust-proof enclosure portion 101a of the projection unit 101 is completed.

As shown in FIG. 18, frame members 23 and 24 are fixed to the television base portion 17 and are fixed to the cabinet shielding structure 400 to support the cabinet shielding structure 400. The projection unit 101 is attached to the structural member 22 shown in FIG. 5, and a chassis unit 500 and a light source unit 600 are arranged in the rear portion of the cabinet shielding structure 400. In this state, it is possible to access the upper surface portion of the window glass plate 9 from which the image light from the projection unit 101 is emitted from the rear portion of the cabinet shielding structure 400, and the small opening 3a of the cabinet shielding structure 400 through which the image light passes is formed in the upper portion thereof.

As shown in FIG. 2 and FIG. 19, a second dust-proof cover 10 covers from the outside of the holding member 14 for the window glass plate 9 in an overlapping manner and is fixed to the cabinet 3. Consequently, the whole dust-proof structure of the image projection apparatus in the present embodiment is established.

As shown in FIG. 20, a back cover 25 is arranged to cover the projection unit 101, the chassis unit 500, the light source unit 600, and the second dust-proof cover 10, and is fixed to the cabinet 3. The back cover 25 is arranged on the outside of the whole dust-proof structure, so that it is possible to provide many heat radiating holes for cooling the chassis unit 500 and the light source unit 600. A suction hole 25a and an exhaust opening 25b can be provided in the side surface of the back cover 25, so that airflow passing the exhaust opening 25b from the suction hole 25a can be ensured. Consequently, the chassis unit 500, the light source unit 600, and moreover the projection unit 101 can be cooled efficiently.

When cleaning dust accumulated on the upper surface of the window glass plate 9, the back cover 25 is removed from the cabinet 3 and the second dust-proof cover 10 is removed from the cabinet 3. The chassis unit 500 and the light source unit 600 do not need to be removed, and the cables thereof do not need to be disconnected. The back cover 25 and the second dust-proof cover 10 are resin molded products and thus are light and are easy to remove.

After removing the back cover 25 and the second dust-proof cover 10, the state becomes as shown in FIG. 18, and the upper surface of the window glass plate 9 can be easily cleaned by inserting a hand from the opening 3a. As described above, because the window glass plate 9 is made small, cleaning time can be shortened. Moreover, because the window glass plate 9 is arranged to tilt on the rear side so as not to be vertical to the image main light beam, the upper surface of the window glass plate 9 is cleaned more easily. Furthermore, at the time of cleaning the window glass plate 9, because the opening area of the part through which the image light 100 passes in the rear portion of the cabinet shielding structure 400 is small, dust from the outside does not easily enter the inside of the cabinet shielding structure 400.

As above, according to the image projection apparatus 1000 in the present embodiment, the screen 1 is arranged on the device front side, the projection unit 101 is arranged on the device rear portion lower side, the image light 100 from the projection unit 101 is emitted upward and is caused to reflect downward by the second reflection mirror 2 arranged in the device upper portion, and the incident angle at which the image light 100 is projected on the rear surface of the screen 1 is set to an acute angle to shorten the depth from the projection unit 101 to the screen 1.

In the image projection apparatus with such configuration, in the present embodiment, the dust-proof enclosure portion 101a which encloses the emission portion of the projection unit 101 airtightly and in which the projection window from which the image light 100 is emitted is formed to direct upward, and the cabinet shielding structure 400 which holds the screen 1 on the front side, in which the opening 3a that introduces the image light 100 emitted from the projection window of the projection unit 101 is opened in the rear portion wall surface along the image light 100 directed upward, and in which the second reflection mirror 2 that reflects the introduced image light 100 toward the rear surface of the screen 1 is arranged are included.

The second dust-proof cover 10 is detachably attached to the opening 3a of the cabinet shielding structure 400, the projection window and the opening 3a are exposed in a state where the second dust-proof cover 10 is removed, and the projection window is covered and the opening 3a is closed in a state where the second dust-proof cover 10 is attached to configure the cabinet shielding structure 400 to have a sealed structure, so that the projection window can be easily exposed and thus the projection window can be easily cleaned.

Moreover, the cabinet shielding structure 400 is configured in a minimum space through which the image light 100 passes, so that the chassis unit 500 and the light source unit 600 can be arranged between the whole dust-proof structure and the design back cover of the projection unit 101, and the heat radiating holes are provided in the side surface of the design back cover, so that airflow from the suction hole 25a to the exhaust opening 25b can be ensured, enabling to configure an efficient cooling structure.

Furthermore, the opening 3a and the projection window are provided adjacent to each other at a predetermined angle, and the size of the small opening 3a is a minimum size required for enabling the image light 100 emitted from the projection window to be introduced and enabling the projection window to be cleaned by inserting a hand in a state where the second dust-proof cover 10 is removed, so that dust does not easily enter the inside of the dust-proof structure even during cleaning of the projection window.

The projection unit 101 includes the aspherical mirror (optical element) 4 that collects the image light 100, and the image light 100 is once collected in a cross shape by this aspherical mirror 4 and is spread again, which enters the second reflection mirror 2. Because the projection window is arranged near the position at which the image light 100 crosses to be a light flux having a minimum diameter, the projection window can be formed with an area as small as possible, whereby size reduction and cost reduction of the device can be realized.

The window glass plate 9 through which the image light 100 passes is arranged to tilt on the rear side so as not to be vertical to the image main light beam, so that the reflection light by the window glass plate 9 does not return to the first reflection mirror 5 or the projection lens 7 that is the emission portion of the optical engine 6, enabling to obtain an effect that the retroreflective light can be reduced and thus the retroreflective light (ghost light) 100d on the screen 1 can be eliminated. Moreover, because the upper surface of the window glass plate 9 tilts on the rear side, cleaning is easy when cleaning the window glass plate 9 from the rear side of the image projection apparatus 1000.

Furthermore, the holding member 14 that holds the window glass plate 9 is provided with the loop-shaped rib 14c, and the upper end of this loop-shaped rib 14c and the back surface in the end portion of the window glass plate 9 are in contact with each other over the entire periphery to configure the airtight dust-proof structure. With this dust-proof structure, dust or chips from the end portion of the window glass plate 9 generated during transportation or upon impact do not fall outside the loop-shaped rib 14c and enter the projection unit 101, so that the inside of the projection unit 101 can be maintained clean.

Moreover, the holding member 14 that holds the window glass plate 9 is provided with the image-light passing opening 14a having a minimum size required for the image light 100 to passes therethrough. In other words, the holding member 14 forms a mask in which the image-light passing opening 14a having a minimum size required for allowing only necessary image light to pass is formed, so that unnecessary light from the projection unit 101 is blocked on the outside of the image-light passing opening 14a and thus contrast and brightness on the screen are improved.

According to the present invention, a projection window can be easily exposed only by removing a dust-proof cover from a light introducing and managing opening provided in a rear surface, so that cleaning of the projection window can be made easy. Moreover, a structure can be made such that dust does not easily enter the inside of a dust-proof structure even during cleaning of the projection window.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus that includes a projection unit that emits image light, a reflection mirror that reflects the image light emitted from the projection unit, and a screen on a rear surface of which the image light reflected by the reflection mirror is projected, the apparatus comprising:
    a dust-proof enclosure portion which stores therein an emission opening of the image light of the projection unit and an optical element of an emission portion airtightly and in which a projection window from which the image light is emitted is formed; and
    a cabinet shielding structure which holds the screen on a front side, in which a light introducing and managing opening which introduces the image light emitted from the projection window of the projection unit and from which cleaning of the projection window is possible is opened in a rear surface, and in which the reflection mirror that reflects the image light introduced from the light introducing and managing opening toward the rear surface of the screen is arranged, wherein
    a dust-proof cover is detachably attached to the light introducing and managing opening of the cabinet shielding structure, the projection window is exposed in a state where the dust-proof cover is removed, and the projection window is covered and a space in the cabinet shielding structure is sealed in a state where the dust-proof cover is attached.

2. The image projection apparatus according to claim 1, wherein
    the light introducing and managing opening and the projection window are provided adjacent to each other, and
    a size of the light introducing and managing opening is a size for enabling the image light emitted from the projection window to be introduced with a slight clearance therearound and enabling the projection window to be cleaned in a state where the dust-proof cover is removed.

3. The image projection apparatus according claim 1, wherein
    the projection unit includes an optical element that collects the image light,
    the image light that is once collected in a cross shape by the optical element and is spread again enters the reflection mirror, and
    the projection window is arranged near a position at which the image light crosses to be a light flux having a minimum diameter.

4. The image projection apparatus according to claim 1, wherein a window glass plate fitted to the projection window is arranged to tilt with respect to an axis line of the image light.

5. The image projection apparatus according to claim 4, wherein a tilt of the window glass plate tilts in a device rear direction.

6. The image projection apparatus according to claim 4, wherein the window glass plate is supported such that an upper end of a loop-shaped rib arranged to surround an opening is closely attached to a lower surface of an outer peripheral portion of the window glass plate over an entire periphery.

7. The image projection apparatus according to claim 4, wherein a holding member that holds the window glass plate configures a mask in which an image light passing opening having a minimum area required for allowing only necessary image light to pass is formed.

8. An image projection apparatus that includes a projection unit that emits image light, a reflection mirror that reflects the image light emitted from the projection unit, and a screen on a rear surface of which the image light reflected by the reflection mirror is projected, and in which the screen is arranged on a device front side, the projection unit is arranged on a device rear portion lower side, the image light emitted upward from the projection unit is reflected downward by the reflection mirror arranged in a device upper portion, and the image light is caused to enter the rear surface of the screen at an acute angle, the apparatus comprising:
 a dust-proof enclosure portion which stores therein an emission opening of the image light of the projection unit and an optical element of an emission portion airtightly and in which a projection window from which the image light is emitted is formed; and
 a cabinet shielding structure which holds the screen, in which a light introducing and managing opening which introduces the image light emitted from the projection window of the projection unit and from which cleaning of the projection window is possible is opened in a rear wall surface extending along the image light directed upward, and in which the reflection mirror that reflects the image light introduced from the light introducing and managing opening toward the rear surface of the screen is arranged, wherein
 a dust-proof cover is detachably attached to the light introducing and managing opening of the cabinet shielding structure, the projection window is exposed in a state where the dust-proof cover is removed, and the projection window is covered and a space in the cabinet shielding structure is sealed in a state where the dust-proof cover is attached.

9. The image projection apparatus according to claim 8, wherein
 the light introducing and managing opening and the projection window are provided adjacent to each other, and
 a size of the light introducing and managing opening is a size for enabling the image light emitted from the projection window to be introduced with a slight clearance therearound and enabling the projection window to be cleaned in a state where the dust-proof cover is removed.

10. The image projection apparatus according claim 8, wherein
 the projection unit includes an optical element that collects the image light,
 the image light that is once collected in a cross shape by the optical element and is spread again enters the reflection mirror, and
 the projection window is arranged near a position at which the image light crosses to be a light flux having a minimum diameter.

11. The image projection apparatus according to claim 8, wherein a window glass plate fitted to the projection window is arranged to tilt with respect to an axis line of the image light.

12. The image projection apparatus according to claim 11, wherein a tilt of the window glass plate tilts in a device rear direction.

13. The image projection apparatus according to claim 11, wherein the window glass plate is supported such that an upper end of a loop-shaped rib arranged to surround an opening is closely attached to a lower surface of an outer peripheral portion of the window glass plate over an entire periphery.

14. The image projection apparatus according to claim 11, wherein a holding member that holds the window glass plate configures a mask in which an image light passing opening having a minimum area required for allowing only necessary image light to pass is formed.

\* \* \* \* \*